(12) United States Patent
Kwon et al.

(10) Patent No.: US 8,261,040 B2
(45) Date of Patent: Sep. 4, 2012

(54) DATA STORAGE DEVICE AND SYSTEM HAVING IMPROVED WRITE SPEED

(75) Inventors: O Deuk Kwon, Seoul (KR); Byung Wook Kim, Suwon-si (KR); Dong-Ho Choi, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 474 days.

(21) Appl. No.: 12/499,984

(22) Filed: Jul. 9, 2009

(65) Prior Publication Data
US 2010/0017565 A1    Jan. 21, 2010

(30) Foreign Application Priority Data
Jul. 16, 2008 (KR) .................... 10-2008-0068866

(51) Int. Cl.
*G06F 12/00* (2006.01)

(52) U.S. Cl. ........ 711/173; 711/100; 711/101; 711/111; 711/112; 711/113; 711/114; 711/115; 711/170; 711/171; 710/9; 710/31; 710/32; 710/33; 710/52; 710/56; 710/57

(58) Field of Classification Search .......... 711/101–114, 711/100, 12, 115, 170, 171, 173; 710/9, 710/31–33, 52, 56, 57
See application file for complete search history.

(56) References Cited

U.S. PATENT DOCUMENTS

| | | | |
|---|---|---|---|
| 2005/0080762 A1* | 4/2005 | Nakashima et al. | 707/1 |
| 2005/0172067 A1* | 8/2005 | Sinclair | 711/103 |
| 2007/0070762 A1* | 3/2007 | Wu et al. | 365/215 |
| 2007/0118682 A1* | 5/2007 | Zhang et al. | 711/103 |
| 2007/0300038 A1* | 12/2007 | Ware | 711/203 |
| 2008/0059694 A1* | 3/2008 | Lee | 711/103 |

FOREIGN PATENT DOCUMENTS

| | | |
|---|---|---|
| JP | 2001216723 A | 8/2001 |
| JP | 2003140838 A | 5/2003 |
| JP | 2007109344 A | 4/2007 |

* cited by examiner

*Primary Examiner* — Tuan Thai
*Assistant Examiner* — Zhuo Li
(74) *Attorney, Agent, or Firm* — Cesari & Reed, LLP; Kirk A. Cesari

(57) ABSTRACT

A data storage device is provided, including a first data storage device electrically storing write data, a second data storage device magnetically storing write data, and a controller partitioning write data into first and second write data portions. The first write data portion is programmed to the first data storage device and the second write data portion if magnetically written to the second data storage device at the same time.

20 Claims, 2 Drawing Sheets

ND SYSTEM
DATA STORAGE DEVICE AND SYSTEM
HAVING IMPROVED WRITE SPEED

PRIORITY STATEMENT

This U.S. non-provisional patent application claims priority under 35 U.S.C. §119 to Korean Patent Application No. 10-2008-0068866 filed on Jul. 16, 2008, the subject matter of which is hereby incorporated by reference.

BACKGROUND

The present invention relates to data processing systems. More particularly, the invention relates to a data storage device capable of improving a write speed, and a data storage system including the data storage device.

Hard disk drives/discs (HDDs) have conventionally been used in numerous applications as data storage devices. HDDs are magnetic storage devices providing large storage capacity at relatively low cost. More recently, HDDs have been replaced by so-called solid state drives/discs (SSDs). This replacement has been made possible by improvements in semiconductor fabrication and design technologies. Like HDDs, SSDs provide large capacity, non-volatile data storage. However, SSDs are wholly electronic devices and do not require the electro/mechanical components used in HDDs. SSDs are generally superior to HDDs in terms of performance reliability.

Data write speeds for contemporary SSDs are similar to that of HDDs. In contrast, data read speeds for SSDs is significantly higher than that of HDDs. The improved performance reliability and faster read speed afforded by SSDs makes them an attractive choice for next-generation mass storage devices. Unfortunately, the manufacturing costs associated with SSDs is still significantly higher than those associated with HDDs, at least on a per data unit storage basis. Accordingly, the replacement of HDDs by SSDs in many applications is not yet economically feasible.

Such economic cost drivers has resulted in the development and use of so-called "hybrid HDDs" that incorporate and emphasize advantages from both SSD and HDD technologies. In practical effect, however, hybrid HDDs merely use some form of SDD as a front-end data buffer while bulk storing the vast majority of received data in an HDD. The full performance capabilities afforded by the SSD operating as independent storage device is yet to be realized in many applications.

SUMMARY

Embodiments of the present invention provide a data storage device providing write speed capabilities that are significantly greater than write speeds associated with conventional hard disk drives (HDDs), conventional solid state drives (SSDs), and conventional hybrid HDDs. Embodiments of the invention also provide a storage controller adapted for use within a data storage device which markedly increases write speed.

According to an aspect of the present invention, there is provided a controller including; a processor configured to provide a control signal; and a selector responsive to the control signal and configured to communicate a first portion of write data received from a host device to a first storage region and a second portion of the write data to a second storage region, wherein the first portion of the write data is electrically stored to the first storage region and the second portion of the write data in magnetically stored to the second storage region.

According to another aspect of the present invention, there is provided a data storage device comprising; a storage controller configured to control receipt and storage of write data received from a host device, a first data storage device configured to electrically store at least a portion of the write data and including a first buffer configured to receive and buffer the write data, and a second data storage device configured to magnetically store at least a portion of the write data and including a second buffer configured to receive and buffer the write data, wherein the storage controller is further configured to compare a size of the write data with a size associated with at least one of the first and second buffers, partition the write data into first and second portions of write data in response to the comparison, and electrically store the first portion of the write data to a first storage region in the first data storage device and magnetically store the second portion of the write data to a second storage region in the second data storage device.

According to another aspect of the present invention, there is provided a data storage system comprising; a host providing write data, a storage controller configured to control receipt and storage of the write data, a first data storage device configured to electrically store at least a portion of the write data and including a first buffer configured to receive and buffer the write data, and a second data storage device configured to magnetically store at least a portion of the write data and including a second buffer configured to receive and buffer the write data, wherein the storage controller is further configured to compare a size of the write data with a size associated with at least one of the first and second buffers, partition the write data into first and second portions of write data in response to the comparison, and electrically store the first portion of the write data to a first storage region in the first data storage device and magnetically store the second.

BRIEF DESCRIPTION OF THE DRAWINGS

The above and other features and advantages of the invention will become more apparent by describing in detail exemplary embodiments thereof with reference to the attached drawings in which.

DESCRIPTION OF EMBODIMENTS

Figure 1:
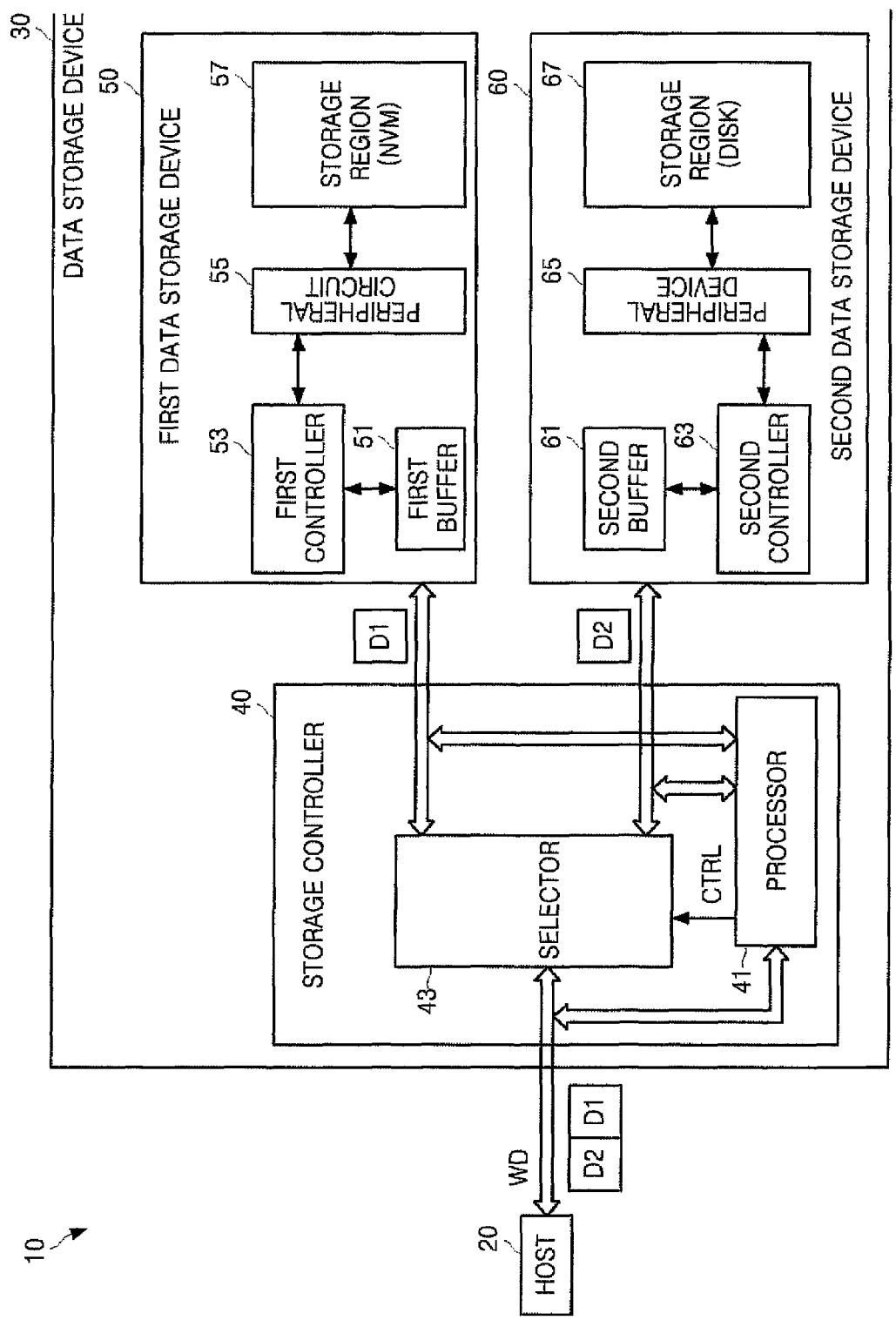
FIG. 1 is a schematic block diagram of a data storage system including a data storage device according to an embodiment of the invention.

FIG. 1 is a schematic block diagram of a data storage system 10 including a data storage device 30 according to an embodiment of the present invention. Referring to FIG. 1, the data storage system 10 includes a host 20 and the data storage device 30.

The data storage system 10 may be incorporated within any consumer equipment (CE) capable of processing or storing data. Examples of such CE include; a hard disk drive (HDD) recorder, a personal portable communication terminal including a cellular phone, a PDA, etc., a computer (for example, a PC, a lap-top PC, a notebook PC, or the like), a navigator device, a home automation system, a music player (for example, an MP3 player or the like), a camcorder, an image player (for example, a DVIX player or the like), a storage server, a portable multimedia player (PMP), etc.

The host 20, e.g., a micro control unit or a chipset, is the general term for devices capable of controlling all operations related to the data storage device 30, such as, a write operation, a read operation, a program operation, and/or an erase operation.

In the illustrated example, the data storage device 30 includes a storage controller 40, a first data storage device 50, and a second data storage device 60. The storage controller 40 controls operations of a first data storage device 50 and a second data storage device 60, for example, a write operation, a read operation, a program operation, or an erase operation. During the write operation, the storage controller 40 writes "write data WD" (i.e., data to be stored in data storage device 30) received from the host 20 to the first data storage device 50 and/or the second data storage device 60 under control of a processor 41. For example, the write data WD may be a data sector, (e.g., an integral multiple of 512 bytes, such as 2048 bytes, 4096 bytes, etc.).

The storage controller 40 includes the processor 41 and a selector 43. The processor 41 determines whether the write data WD received from the host 20 will be stored in the first data storage device 50 and/or the second data storage device 60, and then outputs a control signal CTRL corresponding to this determination. The control signal CTRL is communicated to the selector 43. For example, the processor 41 may determine whether a first portion D1 of the write data WD received from the host 20 will be stored in the first data storage device 50 and a remaining second portion D2 of the write data WD will be stored in the second data storage device 60. Thus, the control signal CTRL provided to the selector 43 may result in the write data WD being stored in one or both data storage devices.

In making the foregoing determination, the processor 41 may compare the size (e.g., a number of data bytes) of available space in a first buffer 51 associated with the first data storage device 50 and/or a second buffer associated with the second data storage device 60. In the illustrated embodiment, the first and second data buffers 51, 61 are provided integral to their data storage device, but may instead be externally associated to receive the write data WD. This "data buffer available space" determination may be used to configure the control signal CTRL provided to the selector 43. Thus, the processor 41 may first determine or calculate the size of the incoming write data WD. This determination may be made, for example, by examining data header information communicated by the host 20 with the write data WD. Then, the processor 41 may examine register value(s) associated with the first and second buffers 51, 61 of the first and second data storage devices 50, 60. Such registers (not shown) are conventionally used to manage (i.e., track) data buffer space, indicating available buffer space, in-use buffer space, blocked buffer space, various data buffer space partitions, etc.

In response to the control signal CTRL received from the processor 41, the selector 43 communicates (i.e., passes or transfers) the write data WD received from the host 20 to the first data storage device 50 and/or second data storage device 60 during one or more write or program operations.

For example, if the size of the write data WD is greater than the available space in the first buffer 51, the selector 43 may communicate only the first portion D1 of the write data WD to the first data storage device 50 during the write/program operation(s). Thereafter, the remaining second portion D2 of the write data WD is communicated to the second data storage device 60 during subsequent (or simultaneously performed) write/program operation(s).

Accordingly, while the first portion data D1 is being transferred to the first buffer 51, and/or while the first portion data D1 already stored in the first buffer 51 is being written/programmed to a first nonvolatile memory (NVM) storage region 57 via a first peripheral circuit 55 under the control of a first controller 53, the second portion data D2 may be transferred to the second buffer 61 or the second portion data D2 already stored in the second buffer 61 may be written/programmed in a second bulk (e.g., disk) storage region 67 via a second peripheral device 65 under the control of a second controller 63.

In certain embodiments of the invention, the functionality of first and second controllers may be combined in a common controller circuit and/or associated software.

In other words, while one write/program operation associated with the second portion data D2 is being directed to the second data storage device 60, another write/program operation associated with the first portion data D1 may be "simultaneously" (i.e., temporally overlapping at least in part) performed within the data storage device 30 of the illustrated embodiment. These simultaneously performed write/program operations may include the process of communicating respective data portions from the selector 43 to the first and second buffers 51, 61. In this manner, the speed with which the write data D1 may be written/programmed within the data storage device 30 may be increased.

In the foregoing example, it has been assumed that the first data storage device 50 is first "selected" by selector 43 to potentially store the entirety of the write data WD received from the host device 20. Hence, if the write data WD is too large for the available space within the first buffer 51, the second data storage device 60 is also selected to receive form portion of the write data WD. The converse is also true. For example, where the second data storage device 60 is initially selected by selector 43 for use in storing incoming write data WD, the first data storage device 50 may additionally be used to efficiently store a block of write data WD intended for the second buffer 61.

Those skilled in the art will recognize that more than two individual data storage devices may be collectively operated in this manner within data storage device 50. Any one of the plurality of individual data storage devices may be initially selected in relation to an incoming block of write data WD, and any other one of the remaining individual data storage devices may be used to receive some portion of the write data WD where the available space in the selected individual data storage device proves inadequate. In this manner, a form of internal write data interleaving may be provided which allows overall improved write data speed.

In certain embodiments of the invention, even when the size of the write data WD is not greater than the size of the available space within the first or second buffer 51 or 61, the selector 43 may nonetheless partition the write data WD into respective portions in response to the control signal CTRL provided by the processor 41. The respective portions of the write data WD may then be sequentially or simultaneously communicated to one from the first buffer 51 and the second buffer 61.

In the foregoing illustrated embodiment, the peripheral circuit 55 of the first data storage device 50 is assumed to include all of the circuits required, and conventionally understood, to write/program the write data WD received from the host 20 to the storage region 57 (e.g., including a row decoder, a column decoder, and a write driver, etc). Additionally, the peripheral circuit 55 may include all of the circuits required to read and/or erase data from the storage region 57.

The peripheral device 65 of the second data storage device is assumed to include all of the circuits and components required to write/read data to/from the storage region 67 (e.g., including a spindle motor, a voice coil motor, a magnetic head, etc.).

Since the operating speed of the host 20 is generally higher than that of the data storage device 30, the first and second buffers 51 and 61 may be collectively used to compensate for this difference in operating speeds. In this regard, the buffer associated with the data storage device 30 may be implemented using some form of fast, volatile memory devices, such as DRAMs, SDRAM, or SRAMs. In contrast, the first data storage device 50 will be implemented in some form of non-volatile memory capable of electrically or electronically storing/accessing data in relation to the first storage region 57.

The first data storage device 50 may be implemented, for example, in read only memory (ROM), a programmable read only memory (PROM), an erasable programmable read only memory (EPROM), an electrically erasable programmable read only memory (EEPROM), a flash memory, a ferroelectrics random access memory (FRAM), a magnetic random access memory (MRAM), a phase change random access memory (PRAM), a nano random access memory (NRAM), a silicon-oxide-nitride-oxide-silicon (SONOS), a resistive memory, or a racetrack memory.

The first data storage device 50 may be implemented into a non-volatile memory device such as a solid state drive (SSD). The first data storage device 50 may be used to store programs or code that is frequently accessed by the host device 20, such as operating system (OS) elements. In contrast, the second data storage device 60 may be implemented using some form of bulk magnetic storage, such as an HDD. This component may be manufactured at a low cost per unit data storage. The second data storage device 60 may be used to store data less frequently accessed, such as text files, video image files, picture files, etc.

Figure 2:
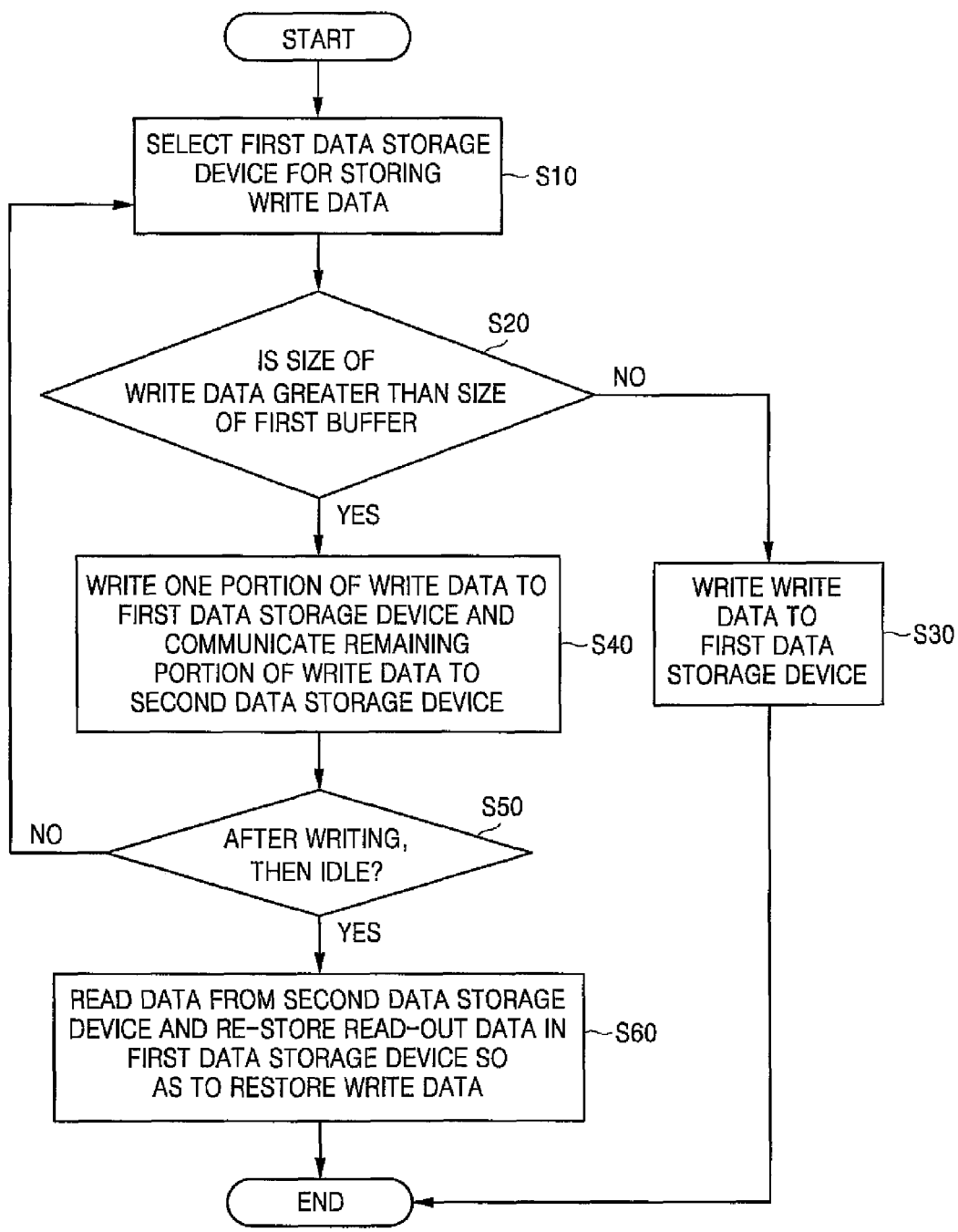
FIG. 2 is a flowchart summarizing a method of operating the data storage system of FIG. 1.

FIG. 2 is a flowchart summarizing a method of operation for the data storage system 10 of FIG. 1. The operation of the data storage system 10 will now be described with reference to FIGS. 1 and 2.

First, the processor 41 in the storage controller 40 selects the first data storage device 50 as a storage device for storing the write data WD in relation to the size of the write data WD received from the host 20 and/or according to user or manufacturing default settings (S10). The write data WD may includes "payload data" that is actually to be written, as well as address data for the first storage region 57 in which the payload data will be stored, and perhaps some form of data header information (i.e., data indicating the size of the incoming write data block).

The processor 41 controls receipt of the write data WD and compares the size of the write data WD with the size of the first buffer 51 or the size of the available space in the first buffer 51 (S20). If the size of the write data WD is less than the size of the first buffer 51 or less than the size of the available space in the first buffer 51, then the processor 41 provides an appropriate control signal CTRL to the selector 43, and selector 43 causes the write data WD to be written to the first data storage device 50 through first buffer 51 (S30). That is, the write data WD buffered in the first buffer 51 is communicated to the first NVM storage region 57 via peripheral circuit 55 under the control of the first controller 53.

However, if the size of the write data WD is greater than the size of the first buffer 51 or greater than the size of the available space in the first buffer 51, the processor 41 provides an appropriate control signal CTRL (or an appropriate sequence of control signals Ctrl) to the selector 43, and the selector 43 causes a first portion D1 of the write data WD to be communicated to the first buffer 51 and a second portion D2 of the write data WD to be communicate to the second buffer 61 (S40).

Transfer of the first and second portion data to the respective buffer and/or the subsequent write/program operations directed to the first and second data storage devices 50, 60 may be sequentially or simultaneously performed. Partitioning of the write data WD into first portion data D1 and second portion data D2 may be done by the selector 43 on a data sector block basis (e.g., some multiple of 512 bytes). The storage controller 40 may be used to store addresses for the various write data portions as stored in the first data storage device 50 and/or the second data storage device 60. In other words, the second portion data D2 may include a number of data sectors, and the storage controller 40 controls addresses in the second storage region 67 at which the sectors are stored. A separate address memory may be associated internally or externally with the storage controller 40.

After the first and second potion data D1, D2 of the write data WD have been written/programmed to the first and second storage regions 57, 67, the storage controller 40 determines whether the data storage device 30 is idle (S50). If not, the storage controller 40 again selects the first data storage device 50 as the storage device for storing additional incoming write data WD.

However, if the data storage device 30 is idle, the storage controller 40 may read the second portion data D2 from the second data storage device 60 by referring to the addresses of the storage region 67 at which the sectors have been stored, and then re-store the second portion data D2 in the first data storage device 50 so as to restore the original block of write data WD (S60).

During this read/re-store operation, the storage controller 40 may store the first data D1 and the second data D2 adjacently or consecutively so as to restore the original write data WD. Thus, during the read portion of the read/re-store operation, the storage controller 40 may read data substantially the same as the original write data WD from the storage region 57 of the first data storage device 50 on the basis of a read command received from the host 20 and transmit the read data to the host 20.

Although a result of the comparison between the size of the first or second buffer 51 or 61, which are installed in the first and second data storage devices 50 and 50, respectively, and the size of the write data WD is used to divide the write data WD in the above-described embodiment, a write data dividing method performed in the data storage device 30 is not limited to.

A storage controller according to one or more embodiments of the invention can increase the write speed by dividing write data into multiple portions and simultaneously writing/programming the multiple portions to different storage devices using entirely different data storage methods. In a data storage device according to one or more embodiments of the invention and a data storage system including the data storage device, one portion of the write data may be written to a first data storage device and at the same time the another portion of the write data may written to a second data storage device. Therefore, a write speed of the overall data storage device can be increased.

While the present invention has been particularly shown and described with reference to exemplary embodiments thereof, it will be understood by those of ordinary skill in the art that various changes in form and details may be made therein without departing from the scope of the invention as defined by the following claims.

What is claimed is:

1. A storage controller comprising:
a processor configured to provide a control signal; and
a selector responsive to the control signal and configured to receive write data from a host device and to selectively communicate the write data to at least one of a first storage region of a data storage device and a second storage region of the data storage device, wherein the first storage regions stores data electrically and the second storage region stores data magnetically,
wherein the processor provides the control signal in response to a comparison between a size of the write data and a size of a selected buffer among a first buffer associated with the first storage region and a second buffer associated with the second storage region, and
wherein when the size of the write data is greater than the size of the selected buffer, then the control signal causes the selector to communicate a first portion of the write data to the first storage region and a second portion of the write data to the second storage region, and when the size of the write data is not greater than the size of the selected buffer, then the control signal causes the selector to communicate the write data to one of the first and second storage regions that is associated with the selected buffer.

2. The storage controller of claim 1, wherein the first storage region is implemented with non-volatile memory and the second storage region is implemented with a magnetic disk.

3. The storage controller of claim 2, wherein the first storage region stores the first portion of the write data by programming the first portion of the write data to the non-volatile memory, and the second storage region stores the second portion of the write data by writing the second portion of the write data to the magnetic disk.

4. The storage controller of claim 3, wherein programming the first portion of the write data and writing the second portion of the write data are performed sequentially.

5. The storage controller of claim 3, wherein programming the first portion of the write data and writing the second portion of the write data are performed simultaneously.

6. The storage controller of claim 1, further configured to determine whether the data storage device is idle after electrically storing the first portion of the write data to the first storage region and magnetically storing the second portion of the write data to the second storage region, and upon determining that the data storage device is idle, to read the second portion of the write data from the second storage region, and re-store the read second portion of the write date in the first storage region.

7. A data storage device comprising:
a storage controller configured to control receipt and storage of write data received from a host device;
a first data storage device including a first storage region configured to electrically store at least a portion of the write data and further including a first buffer associated with the first storage region and configured to receive and buffer the write data; and
a second data storage device including a second storage region configured to magnetically store at least a portion of the write data and further including a second buffer associated with the second storage region and configured to receive and buffer the write data,
wherein the storage controller is further configured to compare a size of the write data with a size associated with a selected one of the first and second buffers, and:
when the size of the write data is greater than the size associated with the selected one of the first and second buffers, to partition the write data into first and second portions, and to electrically store the first portion of the write data to the first storage region and to magnetically store the second portion of the write data to the second storage region, and
when the size of the write data is greater than the size associated with the selected one of the first and second buffers to store the write data in one of the first and second storage regions that is associated with the selected buffer.

8. The data storage device of claim 7, wherein the first storage region is implemented with non-volatile memory and the second storage region is implemented with a magnetic disk.

9. The data storage device of claim 8, wherein electrically storing the first portion of the write data to the first storage region comprises programming the first portion of the write data to the non-volatile memory, and magnetically storing the second portion of the write data to the second storage region comprises writing the second portion of the write data to the magnetic disk.

10. The data storage device of claim 9, wherein programming the first portion of the write data and writing the second portion of the write data are performed sequentially.

11. The data storage device of claim 9, wherein programming the first portion of the write data and writing the second portion of the write data are performed simultaneously.

12. The data storage device of claim 7, wherein the storage controller is further configured to determine whether the data storage device is idle after electrically storing the first portion of the write data to the first storage region and magnetically storing the second portion of the write data to the second storage region.

13. The data storage device of claim 12, wherein the storage controller is further configured, upon determining that the data storage device is idle, to read the second portion of the write data from the second storage region, and re-store the read second portion of the write date in the first storage region.

14. The data storage device of claim 13, wherein the storage control partitions the write data into the first and second portions of write data using multiples of a defined data sector size.

15. A data storage system comprising:
a host providing write data;
a storage controller configured to control receipt and storage of the write data;
a first data storage device including a first storage region configured to electrically store at least a portion of the write data and further including a first buffer associated with the first storage region and configured to receive and buffer the write data; and
a second data storage device including a second storage region configured to magnetically store at least a portion of the write data and further including a second buffer associated with the second storage region and configured to receive and buffer the write data,
wherein the storage controller is further configured to compare a size of the write data with a size associated with a selected one of the first and second buffers, and
when the size of the write data is greater than the size associated with the selected one of the first and second buffers, to partition the write data into first and second portions, and to electrically store the first portion of the write data to a first storage region in the first data storage device and to magnetically store the second portion of the write data to the second storage region, and when the size of the write data is greater than the size associated with the selected one of the first and second buffers to store the write data in one of the first and second storage regions that is associated with the selected buffer.

16. The data storage system of claim 15, wherein the first storage region is implemented with non-volatile memory and the second storage region is implemented with a magnetic disk.

17. The data storage system of claim 16, wherein electrically storing the first portion of the write data to the first storage region comprises programming the first portion of the write data to the non-volatile memory, and magnetically storing the second portion of the write data to the second storage region comprises writing the second portion of the write data to the magnetic disk.

18. The data storage system of claim 17, wherein programming the first portion of the write data and writing the second portion of the write data are performed simultaneously.

19. The data storage system of claim 15, wherein the data storage system is consumer equipment (CE).

20. The data storage system of claim 15, wherein the storage controller is further configured to determine whether the data storage device is idle after electrically storing the first portion of the write data to the first storage region and magnetically storing the second portion of the write data to the second storage region, and upon determining that the data storage device is idle, to read the second portion of the write data from the second storage region, and re-store the read second portion of the write date in the first storage region.

* * * * *